United States Patent
Noel

Patent Number: 5,934,154
Date of Patent: Aug. 10, 1999

[54] HANDGRIP WITH PROTECTIVE ENDCAP

[76] Inventor: Ron Noel, 831 Cole Rd., Monroe, Mich. 48142

[21] Appl. No.: 09/036,075

[22] Filed: Mar. 6, 1998

[51] Int. Cl.[6] .................................................... B62K 21/26
[52] U.S. Cl. ............................................................ 74/551.9
[58] Field of Search ................................ 74/551.9, 551.8, 74/558, 558.5

[56] References Cited

U.S. PATENT DOCUMENTS

| | | | |
|---|---|---|---|
| 581,287 | 4/1897 | Hodgson | 74/551.9 |
| 1,421,098 | 6/1922 | Phillips | 74/551.9 |
| 2,098,509 | 11/1937 | Morgan | 74/551.9 |
| 3,606,325 | 9/1971 | Lamkin et al. | 74/551.9 X |
| 5,125,286 | 6/1992 | Wilson | 74/551.9 |
| 5,155,878 | 10/1992 | Dellis | 74/551.9 X |

FOREIGN PATENT DOCUMENTS

| | | | |
|---|---|---|---|
| 16039 | 6/1912 | Denmark | 74/551.9 |
| 587682 | 11/1933 | Germany | 74/551.9 |
| 90162 | 8/1957 | Norway | 74/551.9 |
| 330243 | 6/1930 | United Kingdom | 74/551.9 |

*Primary Examiner*—John A. Jeffery
*Assistant Examiner*—Mary Ann Battista
*Attorney, Agent, or Firm*—Harry M. Weiss; Harry M. Weiss & Associates, P.C.

[57] ABSTRACT

A handgrip with a protective endcap that is designed to enhance the grip of the operator over the equipment by preventing unintended slippage and protect the operator from injury in the event of loss of control of the equipment. The improved handgrip is comprised of a tubular section which fits over the equipment handle, a protective endcap and a rigid support section which couples the protective endcap to the tubular section. The invention also includes an optional fastener to secure the handgrip to the equipment handle.

19 Claims, 1 Drawing Sheet

HANDGRIP WITH PROTECTIVE ENDCAP

BACKGROUND OF THE INVENTION

1. Field of the Invention

This invention relates generally to an attachable handgrip for commercial, residential and recreational equipment having one or more handles. Specifically the invention is a handgrip with a protective endcap that is designed to enhance the grip of the operator over the equipment by preventing unintended slippage and to protect the operator from injury in the event the operator loses control of the equipment.

2. Description of the Prior Art

The current state of the art describes handgrips for equipment having one or more handles such as commercial and residential lawnmowers, aerators, mulchers, thatchers; recreational equipment such as bicycles, motorcycles, all terrain vehicles and waverunners; and industrial equipment such as jackhammers, augers and surface compactors.

The prior art handgrips provide no protection for the operator should there be loss of control. For example, when control is lost of large, commercial lawnmowers it is quite feasible for the handle to impale the operator in the abdomen or the pelvic area, thus causing severe injury. When operating around external structures such as walls and buildings, it is possible that loss of control will result in wedging the operator's hand between the structure and the equipment handle also causing severe injury.

The prior art handgrips provide little assistance for the operator to maintain his grip. The most common grip enhancement scheme is to provide contours on the underside of the grip for placement of the operator's fingers.

U.S. Pat. No. 245,542 issued to T. W. Moran describes a handgrip with a rubber ball which is slipped over a wooden block to protect against breakage of the equipment. U.S. Pat. No. 3,918,323 issued to Barry H. Prager describes a handgrip for motorcycles which is designed to protect the throttle mechanism. U.S. Design Pat. No. 314,700 issued to Jeffry L. Lurkis describes an ornamental bicycle handgrip design with a slightly bulbous endcap that does not offer the functionality of the present invention.

Thus, there exists a need to provide an improved handgrip which offers the operator protection in the event of loss of control of the equipment and offers the operator an improved apparatus for maintaining grip of the equipment handle.

SUMMARY OF THE INVENTION

It is an object of the present invention to provide a handgrip with protective endcap which prevents impalement of the operator by the equipment handle should loss of control occur.

It is another object of the present invention to provide a handgrip with a protective endcap which prevents injury to the operator's hand.

It is another object of the present invention to provide a handgrip with a protective endcap which enhances the ability of the operator to maintain a grip of the equipment handle.

In accordance with one embodiment of the present invention, a handgrip for use with equipment having at least one handle comprising a tubular section for attaching to the equipment, a rigid support section coupled to one end of the tubular section and an endcap section coupled to the rigid support section is disclosed.

In accordance with another embodiment of the present invention, a handgrip for use with equipment having at least one handle comprising a tubular section for attaching to the equipment, a rigid support section coupled to one end of the tubular section, an endcap section coupled to the rigid support section, and a fastener for securing the handgrip to the handle of the equipment is disclosed.

In accordance with another embodiment of the present invention, the endcap may be of various shapes to protect the operator from injury. These protective shapes include a dome shape and a cylindrical shape.

In accordance with another embodiment of the present invention the handgrip with protective endcap is made from resilient material such as plastic, rubber, polypropylene, polyurethene or other synthetic material which provides resiliency, durability, and cushioning.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
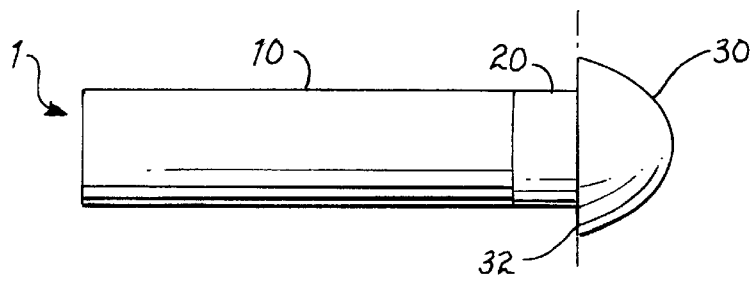
FIG. 1 is a side illustration of one embodiment of the present invention with a dome shape endcap.

Referring to FIG. 1, a handgrip with a protective endcap 1 [hereinafter handgrip 1] is shown. The handgrip 1 is for use with equipment having at least one handle and comprises a tubular section 10 for attaching to the equipment handle, a rigid support section 20 coupled to one end of the tubular section 10 and an endcap section 30 coupled to the rigid support section 20.

Figure 1A:
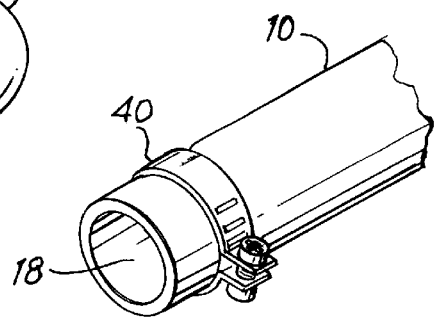
FIG. 1A is an elevated perspective view of another embodiment of the present invention with a fastener.

In an alternate embodiment as shown in FIG. 1A, wherein like numerals relate to like elements, a fastener 40 for securing the handgrip 1 to the handle of the equipment is integrated into the tubular section 10. The fastener 40 may be a simple clamp, a torsion device, tape, wrap or other binding or other types of fasteners known to those skilled in the art.

The tubular section 10 is designed of a hollow sleeve that will fit snugly over the handle of the equipment. This requires that the tubular section 10 has an opening or aperture such that the inner circumference of the aperture is approximately the same as the outer circumference of the handle of the equipment. In the preferred embodiment, the tubular section 10 is made from a resilient material such as plastic, rubber or other synthetics with elastic qualities so that an elastic seal is formed with the equipment handle. In an alternate embodiment, the inner surface 18 of the tubular section 10 is comprised of, or may be coated with an adhesive material for bonding the handgrip 1 to the handle of the equipment.

Figure 3:
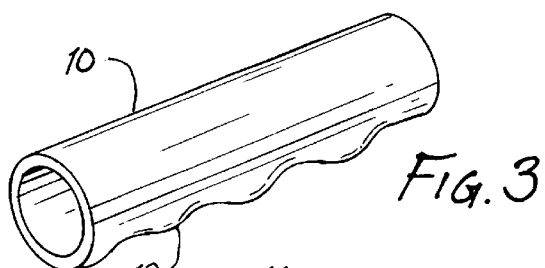
FIG. 3 is an elevated perspective view of one embodiment of the tubular section of the invention having contours to enhance the grip of the operator.
Figure 4:
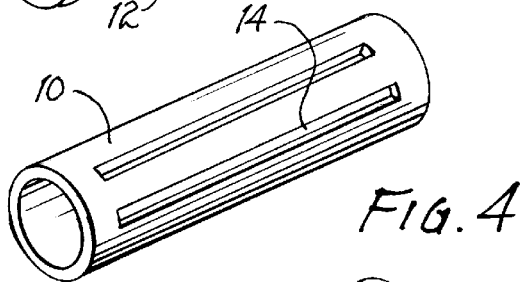
FIG. 4 is an elevated perspective view of another embodiment of the tubular section of the invention having grooves to enhance the grip of the operator.
Figure 5:
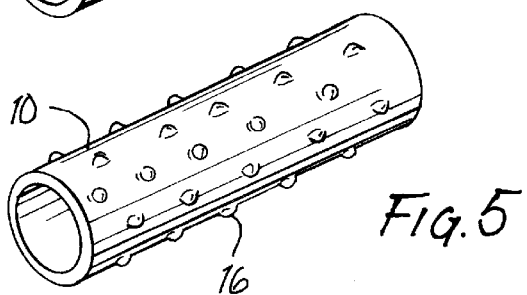
FIG. 5 is an elevated perspective view of another embodiment of the tubular section of the invention having raised relief to enhance the grip of the operator.

Referring to FIGS. 3, 4 and 5, wherein like numerals relate to like elements, alternative embodiments to the smooth outer surface of the tubular section 10 are shown. In FIG. 3, the outer surface of the tubular section 10 is comprised of contours 12 that conform to the operator's fingers to enhance the grip of the operator. In FIG. 4, the outer surface of the tubular section 10 is comprised of grooves 14, also for the purpose of enhancing the grip of the operator. In addition to providing a more textured grip, the grooves 14 also provide a channel for the release of perspiration. In FIG. 5, the outer surface of the tubular section 10 is comprised of raised relief 16 for the purpose of enhancing the grip of the operator. In this embodiment, the raised relief 16 is a series of dots or dimples that may either be in a predictable pattern or may be randomly dispersed on the outer surface of the tubular section 10.

Figure 6:
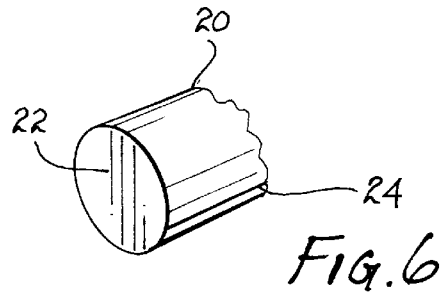
FIG. 6 is an elevated perspective view of the rigid support member.

Referring to FIG. 6, wherein like numerals relate to like elements, a side view of the rigid support section 20 is shown. The rigid support section 20 is a cylindrical member comprised of relatively high density resilient material such as plastic, rubber or other synthetic material. In the preferred embodiment the rigid support section 20 is comprised of a solid material. However, those skilled in the art will recognize that implementations other than a solid material are feasible.

The purpose of the rigid support section 20 is to provide a durable, reliable means for coupling the tubular section 10 to the endcap 30. The cylindrical surface 24 of the rigid support section 20 has an outer circumference that is approximately equal to the circumference of the outer surface of the tubular section 10. A single, contiguous apparatus is formed when bonding the tubular section 10 to one circular, planar surface 22 of the rigid support section 20 and the endcap 30 to the other circular, planar section 22 of the rigid support section 20.

The rigid support section 20 has a secondary purpose of providing additional clearance between the larger circumference endcap 30 and equipment controls such as levers attached to the equipment handle as found, for example, with bicycle brake levers.

In the preferred embodiment, the endcap 30 is comprised of an inner core of highly resilient, cushioning type material to provide maximum protection to the operator in the event of impact due to loss of control. The endcap 30 is further comprised of an outer covering such as vinyl or other synthetic material that is durable and resistant to tears, rips and gouges. In an alternate embodiment, the endcap 30 may be comprised of a single, resilient, cushioning material.

Figure 7:
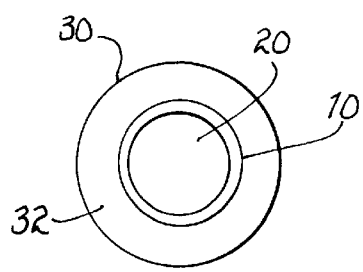
FIG. 7 is an end view of the present invention looking into the aperture of the tubular section that is inserted over the equipment handle.

As shown in FIG. 1, one embodiment of the endcap 30 is a dome shape with a circular, planar surface 32. The circular, planar surface 32 attaches to the rigid support member 20. The circumference of the circular, planar surface 32 is greater than the circumference of the rigid support member 20. Furthermore, as shown in FIG. 7, wherein like numerals relate to like elements, the rigid support member 20 is concentrically coupled to the circular planar surface 32 of the endcap 30.

Figure 2:
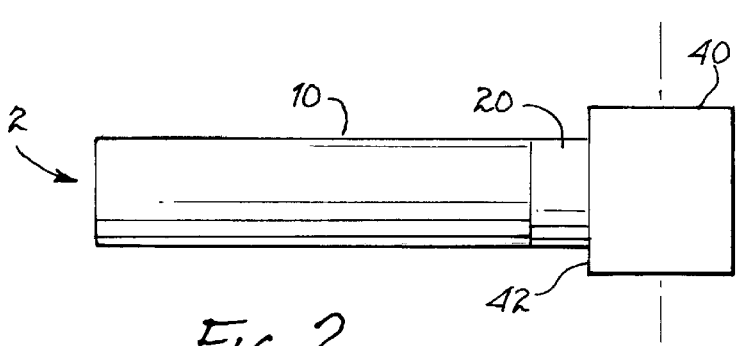
FIG. 2 is a side illustration of another embodiment of the present invention with an cylinder shape endcap.

Referring momentarily to FIG. 2, an alternative embodiment 2 with a cylindrical endcap 40 is shown. Coupling of the cylindrical endcap 40 to the rigid support member 20, as well as the circumferential attributes, are as found with the dome shape endcap 30 described above and as shown in FIGS. 1 & 7.

The configuration of a concentrically coupled endcap 30 & 40 with a circumference that exceeds that of the rigid support member 20 yields three results. First, the greater circumferences of the circular, planar surfaces 32 & 42 of the endcap 30 & 40, respectively, prevent accidental slippage of the operator's hand from the handgrip. Second, the greater circumference of the endcaps 30 & 40 provide additional protection to the operators hand in the event of inadvertent contact by the equipment handle with external objects. Third, should the operator lose control of the equipment and the equipment handle strike the operator in the abdomen or pelvic area, a greater cushioning effect is provided by the enlarged endcaps 30 & 40.

There are various methods of coupling the tubular section 10 and the endcap section 30 to the rigid support section 20. These methods are known to those skilled in the art and include adhesives, epoxies, thermal bonding, and other methods of bonding plastics, rubber and synthetic materials.

In an alternate embodiment, the tubular section 10, rigid support section 20 and endcap section 30 can be formed and fabricated simultaneously as one contiguous apparatus via such processes as injection molding.

In still another alternate embodiment, the tubular section 10 and the rigid support section 20 can be formed and fabricated simultaneously as one contiguous apparatus via such processes as injection molding and the endcap section 30 can be subsequently attached via the bonding methods described above.

In still another alternate embodiment, endcap section 30 and the rigid support section 20 can be formed and fabricated simultaneously as one contiguous apparatus via such processes as injection molding and the tubular section 10 can be subsequently attached via the bonding methods described above.

In still another alternate embodiment, the invention comprises only the tubular section 10 and the endcap section 30. The various methods of attachment and injection molding described above are applicable to this embodiment.

Although the invention has been particularly shown and described with reference to a preferred embodiment thereof, it will be understood by those skilled in the art that changes in form and detail may be made therein without departing from the spirit and scope of the invention.

What is claimed is:

1. A handgrip for use with equipment having at least one handle comprising:

a tubular member having apertures at both ends wherein the aperture at the first end is for attaching to the handle of the equipment;

a non-hollow rigid support member having two ends wherein one end of the rigid support member is attached directly and sequentially to the second end of the tubular member; and an endcap member directly and sequentially attached to the rigid support member.

2. The handgrip in accordance with claim 1 wherein the endcap member is comprised of a single material that is resilient and resistant to damage and that provides for a compressible cushion.

3. The handgrip in accordance with claim 1 wherein the handgrip is further comprised of a fastener for securing the handgrip to the handle of the equipment wherein the fastener is coupled exclusively to the tubular member of the handgrip.

4. The handgrip in accordance with claim 1 wherein the tubular member is comprised of a hollow sleeve of resilient, elastic material such that B2 end of the tubular member is a circular opening of approximately a same circumference as a circumference of the handle of the equipment.

5. The handgrip in accordance with claim 4 wherein the inner surface of the tubular member is comprised of an adhesive material for bonding the handgrip to the handle of the equipment.

6. The handgrip in accordance with claim 4 wherein the outer surface of the tubular member is comprised of contours to enhance the grip of the operator.

7. The handgrip in accordance with claim 4 wherein the outer surface of the tubular member is comprised of grooves to enhance the grip of the operator.

8. The handgrip in accordance with claim 4 wherein in the outer surface of the tubular member is comprised of raised relief to enhance the grip of the operator.

9. The handgrip in accordance with claim 1 wherein the rigid support member is comprised of resilient material.

10. The handgrip in accordance with claim 9 wherein the rigid support member is a solid, cylindrical member.

11. The handgrip in accordance with claim 10 wherein the rigid support member is bonded on one end to the tubular member and further bonded on the other end to the endcap member to form one, contiguous apparatus.

12. The handgrip in accordance with claim 10 wherein the rigid support member has a circumference which is approximately equal to an outer circumference of the tubular member.

13. The handgrip in accordance with claim 1 wherein the endcap member is comprised of:

an outer material that is resilient and resistant to damage; and an inner material that is resilient and provides a compressible cushion.

14. The handgrip in accordance with claim 13 wherein the endcap member is further comprised of:

an outer surface that is a circular plane; and an outer surface that is dome shaped.

15. The handgrip in accordance with claim 14 wherein the endcap member has a circumference at the circular plane such that the circumference of the circular plane is greater than the circumference of the rigid support member.

16. The handgrip in accordance with claim 15 wherein the rigid support member is concentrically coupled to the circular plane of the endcap member.

17. The handgrip in accordance with claim 13 wherein the endcap member is comprised of a solid, cylindrical member.

18. The handgrip in accordance with claim 17 wherein the endcap member has a circumference that is greater than the circumference of the rigid support member.

19. The handgrip in accordance with claim 18 wherein the rigid support member is concentrically coupled to the solid, cylindrical member.

* * * * *